United States Patent
Mayer

(10) Patent No.: US 7,187,853 B2
(45) Date of Patent: Mar. 6, 2007

(54) SPEED CONTROL OF A D.C. MOTOR

(75) Inventor: Walter Mayer, Brühl (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 243 days.

(21) Appl. No.: 10/842,040

(22) Filed: May 7, 2004

(65) Prior Publication Data

US 2005/0002656 A1  Jan. 6, 2005

(30) Foreign Application Priority Data

May 9, 2003  (DE) ................................ 103 22 118

(51) Int. Cl.
*H02P 7/06* (2006.01)
*H02P 5/06* (2006.01)

(52) U.S. Cl. ...................... 388/803; 388/833; 388/804; 318/432; 318/449

(58) Field of Classification Search ........ 318/280–283, 318/599, 432, 449; 388/803, 833, 804
See application file for complete search history.

(56) References Cited

U.S. PATENT DOCUMENTS

| | | | |
|---|---|---|---|
| 4,588,934 A * | 5/1986 | Suzuki et al. ............... | 318/449 |
| 4,668,906 A | 5/1987 | Ekstrand | |
| 4,719,395 A | 1/1988 | Aoi et al. | |
| 4,806,832 A * | 2/1989 | Muller ........................ | 388/833 |
| 4,856,078 A | 8/1989 | Konopka | |
| 4,995,094 A | 2/1991 | Aio | |
| 5,136,138 A * | 8/1992 | Gilliland ................... | 219/130.1 |
| 5,528,721 A | 6/1996 | Searcy, II et al. | |
| 5,857,061 A | 1/1999 | Chang et al. | |
| 5,883,488 A * | 3/1999 | Woodward .................. | 318/786 |
| 6,060,849 A * | 5/2000 | Tai et al. ..................... | 318/432 |
| 6,259,172 B1 * | 7/2001 | Lee ............................. | 307/125 |
| 6,937,180 B1 * | 8/2005 | Muratov et al. ............ | 341/154 |
| 2004/0160208 A1 * | 8/2004 | Youm et al. ................. | 318/801 |
| 2005/0264253 A1 * | 12/2005 | Ivankovic ................... | 318/685 |

\* cited by examiner

*Primary Examiner*—Paul Ip
(74) *Attorney, Agent, or Firm*—Brinks Hofer Gilson & Lione

(57) ABSTRACT

The invention relates to a circuit and a method for the speed control of a d.c. motor, particularly the speed control of a fan driven by this d.c. motor, which is used as part of an air distribution system in passenger and commercial motor vehicles. The circuit for the speed control of a d.c. motor includes, according to the invention, a d.c. motor and a supply voltage supplying this d.c. motor, a control module for the generation of PWM-signals and registration of measurement currents and measurement voltages, a number n of parallel-connected field effect transistors which are designed suppliable with PWM-signals in a cascade manner to switch the d.c. motor, and a number n−1 resistors which are designed each to be connected with one of the n field effect transistors which are designed each to be connected with one of the n field effect transistors, whereby n is at least 2.

13 Claims, 4 Drawing Sheets

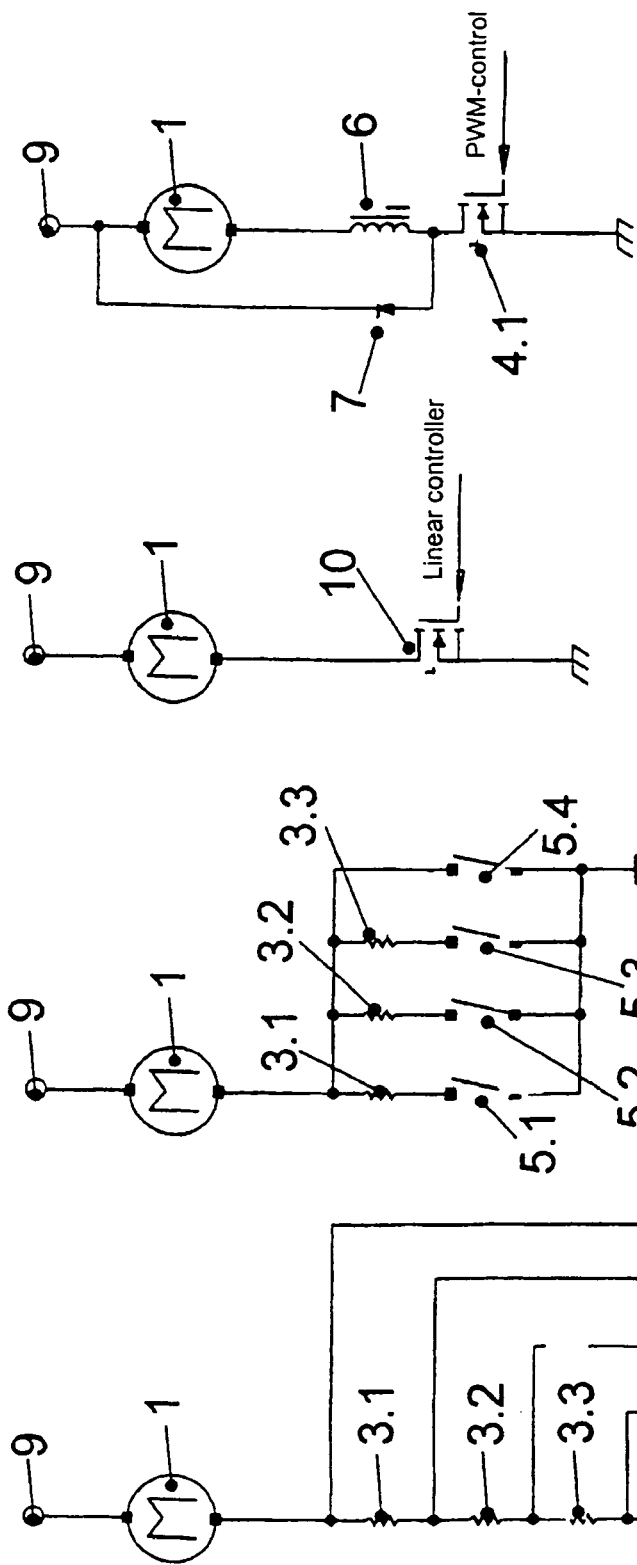

SPEED CONTROL OF A D.C. MOTOR

FIELD OF THE INVENTION

The invention relates to a circuit and a method for the speed control of a d.c. motor, particularly for the speed of a fan driven by the d.c. motor, which is used as a part of an air distribution system in passenger and commercial motor vehicles.

BACKGROUND

With the trend to more comfort and a more effective energy management of electric loads in vehicles, particularly in future vehicle generations, it is necessary to design also the fans provided to distribute the air in the vehicle interior to be energetically optimized.

A simple possibility to control the speed of d.c. motors step-by-step is changing the slope of the speed line by means of one or several resistors connected to each other in parallel or in series. In case of series-connected resistors, each desired speed requires a separate resistor. The number of the required resistors can be reduced using resistors connected in parallel. Interconnection of just three resistors of the d.c. motor in series results in only four combinations, or speeds, respectively. A higher number of resistors connected to each other increase the number of different speeds and hence the comfort, but cannot be implemented for practical reasons due to the high number of components and the circuit cabling needed.

Another possibility of speed control of d.c. motors raises from using an electronic linear controller. Linear voltage is applied to a transistor so that any speed can be set. Apart from the considerable weight, the main disadvantage is that the power not demanded by the load is changed into heat losses, which the control chip must be continuously release to the environment. Such a release of heat losses is always problematic. Thus, this problem is the main failure cause of overheated transistors.

Another strategy to control speeds is the use of pulse width modulation (PWM) in connection with an inductance coil. A pulsed field-effect transistor (FET) switches and thus limits the current flowing through a coil. The pulsed signal functions to switch on and off the current flowing through the FET, which leads to a smaller power loss. In practice small coils are provided to allow frequencies above the human audibility threshold, i.e. of more than 20 kHz, to be used. The disadvantage of this control strategy is that high frequencies must be applied to the transistor. The fast switching on and off the board voltage in combination with a high-current level leads to high EMC-relevant radiation (electromagnetic compatibility). Additional coils and condensers are necessary to avoid this EMC-relevant radiation in order to meet EMC requirements. This leads to higher costs.

From U.S. Pat. No. 4,856,078 a fan motor, preferably for computers, is known which is series-connected to a pulsed transistor and a voltage source. The pulsed signals with constant amplitudes are produced by a so-called 555 timer whose pulse duty factor can be varied dependent on the temperature by a variable resistor. The pulse frequency is specified to be 10 Hz at a pulse duty factor of 30 to 90% to enable the fan starting. Application of this fan motor, however, is limited to a power range of between 5 and 20 W, because higher powers taken lead to higher levels of noise loading during the start of the motor on the one hand, and create too high heat loads on the other hand.

In U.S. Pat. No. 4,588,934 a control method for vehicle fans is disclosed which includes two generators, one with randomly variable signals and the other with triangular signals, and a comparison element, whereby the comparison element generates a pulsed signal which is applied to a subsequent transistor. The basic idea of this invention is that random speeds of the fan motor are created in order to enhance the passengers' comfort a specific disadvantage of the transistor to which several kHz are applied is that the EMC-relevant radiation has a very high level.

Concerning the spurious radiation requirements, motor vehicles have a special status compared to other products, because their components are locally arranged not very distant from each other, which causes mutual disturbances and interference, particularly by the car radio. Therefore, these components are required to give off a very low spurious radiation in view of electromagnetic fields.

It is one objective of this invention to propose a circuit and a method for the speed control of a d.c. motor that improve the electromagnetic compatibility (EMC), particularly concerning vehicles, and demand a smaller number of electric and/or electronic components to meet the function requirements thus reducing the implementation costs.

SUMMARY

The present invention provides that n field-effect transistors are cascade-like supplied one after each other dependent on the pulse duty factor of a pulse width modulation, preferably 10 to 100%, with pulsed signals the frequency of which is <20 Hz whereby the power losses in the FETs are minimized by the resistors connected thereafter. The d.c. motor is powered from a voltage source of the board electric supply system, i.e. the three-phase generator or, during no-load operation of the vehicle or when the engine is at rest, the battery. In the following description this voltage source is referred to as the supply voltage. As signal source delivering control signals for the field-effect transistors (FETs), a control module is provided that generates pulsed signals (PWM). These pulsed signals are applied to a number of n of parallel-connected FETs, one after the other, whereby the resistors, connected after each FET, are used to reduce the current passing the motor.

The number of the resistors used follows the function n−1, wherein n is the number of FETs and being at least 2. According to the invention the resistors with different ohmic resistances can be connected in parallel or in series. According to a preferred embodiment of the invention, instead of one of these resistors, an electric load, such as an electric front or rear windscreen heating, can also be used. The advantage to replace a resistor with an electric load is that the costs of the resistor become unnecessary by the fact that an electric load, anyhow required, is particularly advantageously supplied with voltage. The electric load can alternatively be set into operation after the motor was switched on or without the switching on of the motor. Practically, it may be necessary to commonly operate, for instance, the front windscreen heating and the fan motor, particularly in wintertime, when it is desired to quickly deice the front windscreen or continuously keep it clear. In case of single operation, i.e. the operation of the electric load independent of the switching state of the motor, a further FET is used to bridge the motor. Preferably at least one FET is adopted to be a self-protecting FET for overload protection. If the motor is blocked, the voltage in the resistors or the self-protecting FET rises. The voltage rise is detected by the control module and the corresponding control routines to switch off the PWM will be started. As measured quantities, a measurement current and the measurement voltage before and after the motor, i.e. the difference of the supply voltage minus the voltage drop over the motor, are sensed. In addition to the recording of the measurement voltage also the measurement current is recorded in order to protect resistors, the FETs or the d.c. motor from overload. To obtain this, preferably a shunt resistor, a FET with current mirroring output or a sensor which registers a magnetic field, such as a Hall sensor, a magneto-sensitive resistor or a giant-magneto-resistive sensor is used. A specific threshold value is specified for each failure state in each switching condition of the motor. When the current exceeds the specified threshold value, the failure state is detected and the FETs are switched off.

A particular advantage of the circuit and the method for the speed control of the invention is that as a result of the recording and evaluation of a measurement voltage or a measurement current, the speed of the motor can be calculated as the generator voltage is proportional to the motor speed. For the calculation, the equivalent circuit of the motor is used, whereby due to the slow change of the motor speed the influence of the inductance compared to that of the ohmic resistance is negligibly small and therefore not taken into account. The voltage, which can be recorded at the motor output, $U_s$ is the generator voltage U plus the voltage drop over the control module $I*R_i$.

The following equation yields the desired generator voltage U:

$$U = U_s - I*R_i$$

It has been found that spurious radiation can be significantly reduced if the FETs are pulsed at a frequency <20 Hz. Further, when PWM with a variable pulse duty cycle of the control signal is used, the number of the resistors needed can be reduced to 1 to 2 compared to the state-of-the-art, which contributes to a not insignificant cost reduction.

The significant advantages and features of the invention over the state-of-the-art are essentially:

The power losses in the transistor are minimized by the resistor connected after it.

The EMC is improved because the pulsed signals have a frequency of only <20 Hz.

The number of the resistors needed is reduced to 1 to 2.

BRIEF DESCRIPTION OF THE DRAWINGS

In the following invention is exemplarily explained by means of the drawings, of which shows:

FIG. 1 the state-of-the-art—manually switchable speed setting with series-connected resistors;

FIG. 2 the state-of-the-art—manually switchable speed settings with parallel-connected resistors;

FIG. 3 the state-of-the-art—speed control using a linear controller;

FIG. 4 the state-of-the-art—PWM-supported speed control using a transistor;

DETAILED DESCRIPTION OF THE INVENTION

Figure 5:
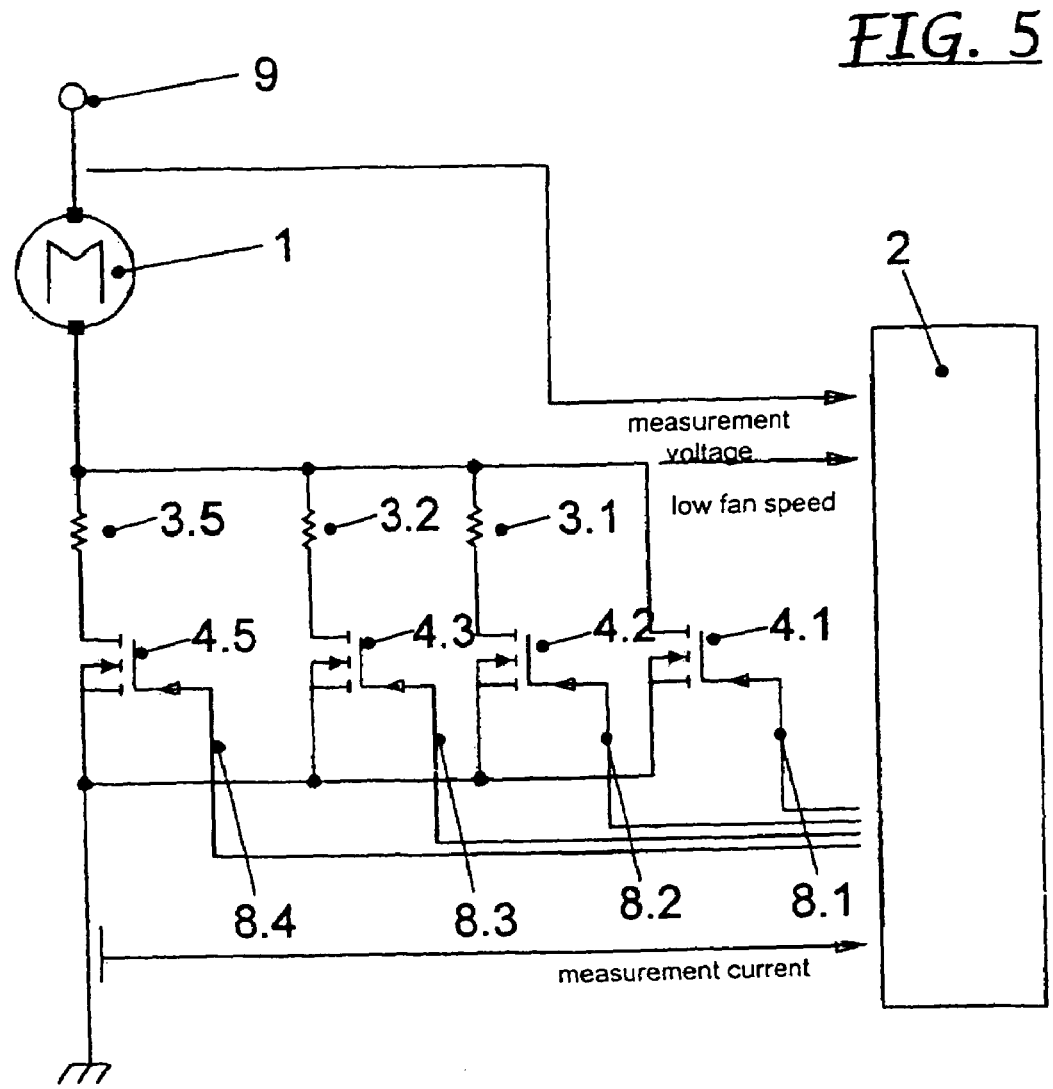
FIG. 5 speed control according to a first preferred embodiment.

The FIGS. 1 and 2 represent a simple possibility of the manually switchable speed control of the state-of-the-art. Series-of parallel-connected resistors 3 are used to enable the current through the motor 1 and hence the speed of the fan driven by the motor 1 to be controlled. In series-connection, different voltage drops are obtained by the resistors 3. Single resistors 3 are manually switched using the switch 5 in series and in parallel connection. In parallel connection, the current distributes to the various branches and a voltage drop following the product $I_n*R_n$ 3.5 arises. To FIG. 1 the resistors 3.1 to 3.4 are switched according to the corresponding position of the switch 5.1, which results in an increased or reduced voltage drop and hence a variable speed adjustment of the fan driven by the motor 1. In FIG. 2 the switches 5.1 to 5.3 are assigned to the resistors 3.1 to 3.3. Bypassing the resistors 3.1 to 3.3 a maximum fan speed can be achieved by means of the switch 5.4, because no other ohmic resistor 3 is intermediately connected.

FIG. 3 illustrates a speed control with a linear controller. Supply voltage 9 of the motor 1 is from board voltage while the control voltage of the gate of the transistor 10 is ensured by a linear voltage. The gate of the transistor 10 is supplied with control voltage in such a way that the motor 1 can be operated with any voltage between 0 v and the supply voltage, which allows any speed to be adjusted. For a power output of approx. 50%, the maximum energy is consumed in the transistor 10.

FIG. 4 schematically represents a PWM-supported speed control with inductance coil 6, in which a field-effect transistor 4.1, to which a PWM rectangular voltage 8 is applied, switches the current passing a coil 6. In the inductance coil 6 a mean current adjusts itself proportional to the pulse width percentage of PWM-signal. The FET 4.1 is either switched on or switched off, which results in a lower power loss in the FET 4.1. The diode 7, which is parallel to the motor 1, further leads the freewheeling current of the inductance oil 6 over the motor 1. In this case the control does not restrict itself to speed, but also addresses torque and power of the motor 1.

FIG. 5 represents the first preferred embodiment of the speed control circuit embodying the principles of the invention. Voltage supply 9 of the motor 1 is by the indicated vehicle-internal board or supply voltage 9. The control module 2 is used as a signal source for the generation of a PWM rectangular voltage 8.1 to 8.4 to control four field-effect transistors (FETs) 4.1 to 4.3 and 4.5 arranged cascade-like in parallel. A resistor 3 is connected after each FET 4 except FET 4.3, and resistor 3.1 is assigned to FET 4.2. The resistors 3 are parallel-connected. According to the invention resistor 3.1 has the smallest ohmic resistance while resistor 3.5 has the highest ohmic resistance. The control module 2 continuously measures the supply voltage, the voltage after the motor 1 and the current passing the motor 1. Dependent on the measured values, a switching sequence of the control signals 8 to control all field-effect transistors 4 is generated according to the invention. The FET 4.5, to which full pulse width is applied, with the highest-resistance resistor 3.5 connected after it performs the switching on and off of the motor 1. Applying a control current to the gate of the FET 4.1 a collector current flows, which rotates the motor 1.

Experience has shown that this lowest switching step cannot operate using PWM-signals, because at a very low speed a pulsed current signal creates extensive noise. To obtain higher motor, or fan speeds, respectively, a pulsed signal 8.3 with smaller pulse duty cycle is applied to the FET 4.3 producing the power loss over the resistor 3.2. To increase the speed of the motor 1 the pulse duty cycle of the pulsed signal 8.3 is increased up to 100%. When the maximum pulse duty cycle for the pulsed signal 8.3 has been reached, a desired further increased motor speed is obtained by the application of the signal 8.2 to the FET 4.2 at a low pulse duty cycle. Because the resistor 3.1 assigned to it has a smaller ohmic resistance compared to each resistor 3.5 and 3.2, respectively, assigned to the FETs 4.5 and 4.3, respectively, the voltage drop over the resistor 3.1 is smaller and the motor voltage correspondingly higher.

When the maximum pulse duty cycle for the pulsed signal 8.2 has been reached, a desired further increased motor speed is obtained by the application of signal 8.1 to the FET 4.1 with a low pulse duty cycle. As no resistor is assigned to this FET 4.1, the fan reaches its maximum speed for a 100% control, or pulsed signal 8.1.

That means that pulsed signals 8 are applied to all field-effect transistors 4 one after the other, dependent on the pulse duty cycle, until the maximum speed of the motor 1 is reached. It is understood that the motor 1 is in operation during the electronic switching.

In practice, it is sufficient to parallel-connect at least two FETs 4, whereby a first FET 4 functions to turn on and off the motor 1 and a second FET 4, to which pulsed signals 8 can be applied, switches the motor 1.

The power loss in the resistors 3 avoids, on the one hand, power losses in the FETs 4 and hence the increased failure rates of the FETs caused hereby and, on the other hand, the possibility of a simple pcb layout raises without the need to release the heat produced by a high power loss in the FETs through cooling devices.

Figure 6:
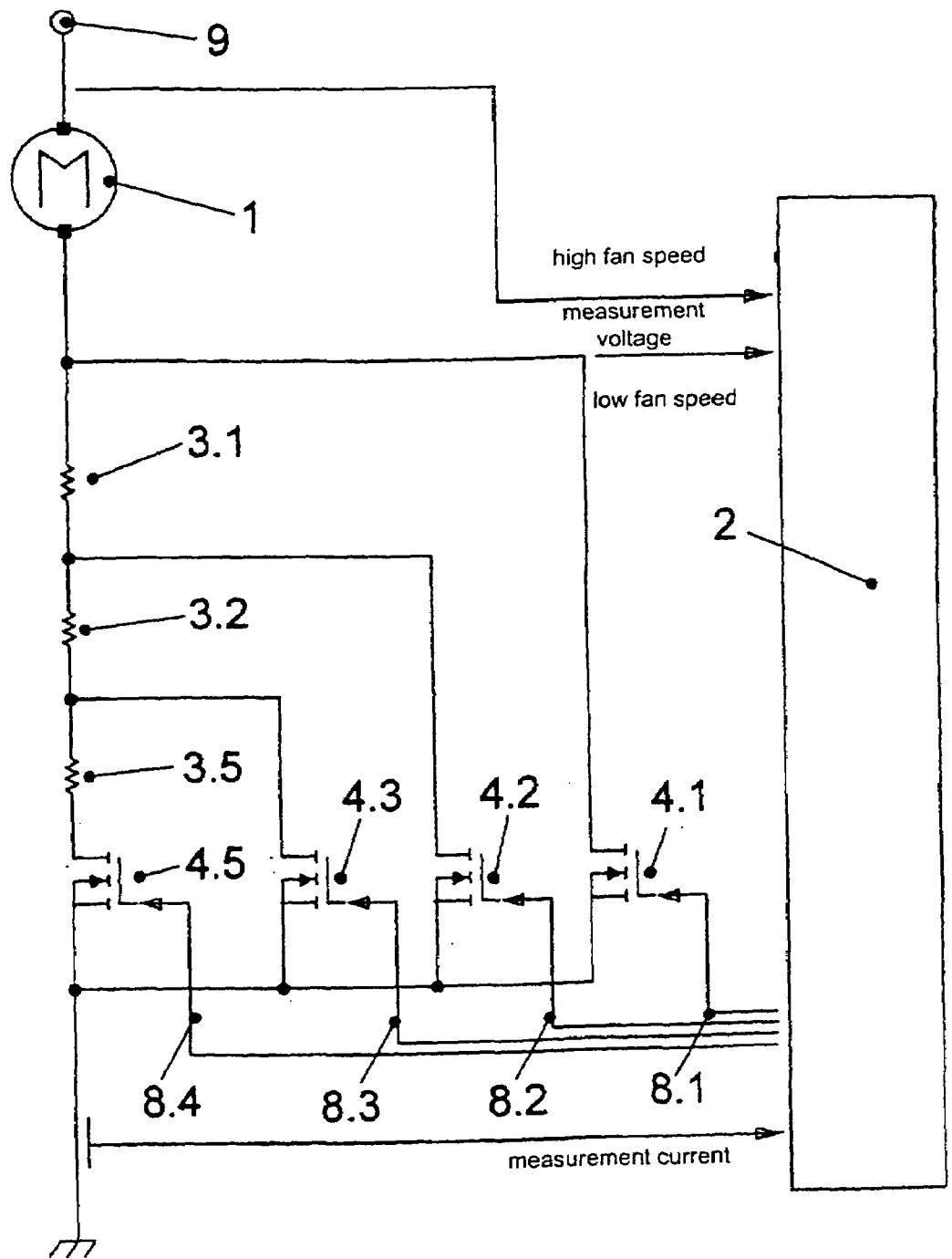
FIG. 6 speed control according to a second preferred embodiment.

FIG. 6 shows the second preferred embodiment of the speed control embodying, the principles of the invention. As against FIG. 5 the resistors 3 connected after the FETs 4 are arranged in series in this circuit. Switching on and off on the d.c. motor by the FETs 4.3, 4.2 and 4.1. At low motor speeds, the FET 4.3 is pulsed with pulsed signals 8.3 whereby a voltage drop is caused by the resistors 3.1, 3.2 and 3.5. To increase the motor speed the duty cycle of the pulsed signal 8.3 is raised to 100%, and for a desired further increase of the speed the FET 4.2 is supplied with pulsed signals 8.2 at an initially low pulse duty cycle. By bypassing the resistors 3.5 and 3.2 a lower voltage drop over the resistor 3.1 arranged after them results. Until the maximum motor speed is reached, the FETs 4.1 to 4.3 and 4.5 are supplied with pulsed signals 8.1 to 8.4 one after the other. To reach the maximum speed of the motor 1, exclusively the FET 4.1 is supplied with its appropriate pulsed signal 8.1.

Figure 7:
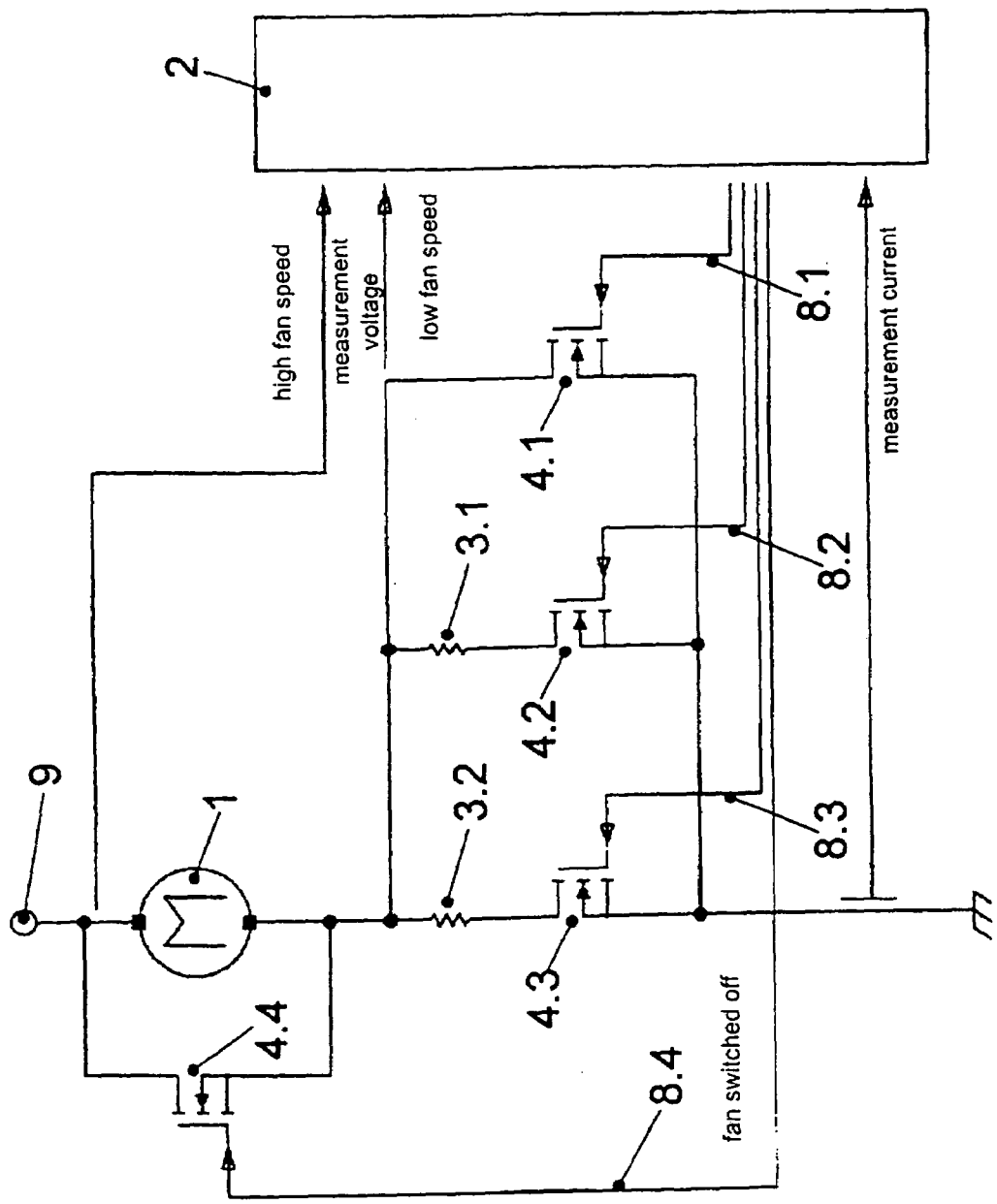
FIG. 7 speed control according to a third preferred embodiment.

FIG. 7 illustrates a third preferred embodiment of the invention, in which one of the resistors 3.1, or 3.2, respectively, was replaced with an electric front widescreen heating and/or the other resistor 3.1, or 3.2, respectively, with an electric rear windscreen heating. Switching on and off of the motor 1 is made by applying the control signal 8.3 to the FET 4.3. Increase of the motor speed is reached in a manner corresponding to the FIGS. 5 and 6 described above.

FIG. 7 shows that in the single operational mode, that is the operation of the electric load independent of the switching state of the d.c. motor 1, a FET 4.4 is used which bridges the d.c. motor. The control module 2 controls the FET 4.4 by applying a control signal 8.4 and 100% pulse duty cycle. The FET 4.4 functioning to bridge the motor must be used if it is not intended to operate the fan motor with the front widescreen heating and/or rear windscreen heating switched on.

The invention claimed is:

1. A circuit for the speed control of a d.c. motor including:
   - a d.c. motor and a supply voltage supplying this d.c. motor;
   - a control module for the generation of PWM-signals and registration of measurement currents and measurement voltages;
   - a number n of parallel-connected field effect transistors which are designed capable of being supplied with the PWM-signals in a cascade manner to switch the d.c. motor; and
   - a number n−1 resistors which are designed each to be connected with one of the n field effect transistors wherein each resistor is in electrical series connection with one of the parallel connected field effect transistors to form a resistor/transistor pair, and wherein each resistor/transistor pair is in parallel electrical connection with each of the other pairs.

2. The circuit according to claim 1 wherein the number of resistors is n−1 and the number of the field effect transistors connected before them is n, whereby n is at least 2.

3. The circuit according to claim 1 wherein the resistors have different ohmic values and are series-connected to each other.

4. The circuit according to claim 1 wherein the resistors have different ohmic values and are parallel-connected to each other.

5. The circuit according to claim 1 wherein instead of at least one resistor an electric load is provided.

6. The circuit according to claim 5 wherein the electric load is a windscreen heating device.

7. The circuit according to claim 5 wherein the electric load can be operated independent of the switching state of the d.c. motor.

8. The circuit according to claim 1, wherein at least one field effect transistor is designed as self-protecting field effect transistor.

9. The circuit according to claim 1, wherein the control module is designed to register the measurement current and/or the measurement voltage in order to protect at least one of the resistors, the field effect transistors, and the d.c. motor from being overloaded.

10. The circuit according claim 1, wherein the control module is designed to register the measurement current and/or the measurement voltage in order to enable the motor speed of a d.c. motor being calculated.

11. The circuit according to claim 1, wherein one of the parallel connected field effect transistors is connected in parallel electrical connection with each of the resistor/transistor pairs to provide an electrical path around the resistor/transistor pairs without an additional resistive load.

12. The circuit according to claim 1, wherein the control module is configured to sense a measurement current through the motor.

13. The circuit according to claim 1, wherein the measurement voltage is measured across the motor.

* * * * *

UNITED STATES PATENT AND TRADEMARK OFFICE
CERTIFICATE OF CORRECTION

| | |
|---|---|
| PATENT NO. | : 7,187,853 B2 |
| APPLICATION NO. | : 10/842040 |
| DATED | : March 6, 2007 |
| INVENTOR(S) | : Walter Mayer |

Page 1 of 1

It is certified that error appears in the above-identified patent and that said Letters Patent is hereby corrected as shown below:

On the Title Page, item -30- under "Foreign Application Priority Data", delete "103 22 118" and substitute --103 22 118.2-32-- in its place.

On the Title Page, item -57-, under "ABSTRACT", after "a number" delete "n" and substitute --$n$-- in its place.

On the Title Page, item -57-, under "ABSTRACT", after "and a number" delete "n-1" and substitute --$n-1$-- in its place.

On the Title Page, item -57-, under "ABSTRACT", after "with one of the" delete "n" and substitute --$n$-- in its place.

On the Title Page, item -57-, under "ABSTRACT", after "of the" delete "n" and substitute --$n$-- in its place; and after "whereby" delete "n" and substitute --$n$-- in its place.

Column 6, in claim 1, line 7, after "a number" delete "n" and substitute --$n$-- in its place.

Column 6, in claim 1, line 11, after "a number" delete "n-1" and substitute --$n-1$-- in its place.

Column 6, in claim 2, line 2, after "resistors is" delete "n-1" and substitute --$n-1$-- in its place.

Column 6, in claim 2, line 3, after "before them is" delete "n" and substitute --$n$-- in its place; and after "whereby" delete "n" and substitute --$n$-- in its place.

Signed and Sealed this

First Day of May, 2007

JON W. DUDAS
*Director of the United States Patent and Trademark Office*